United States Patent [19]

Suzuki

[11] Patent Number: 4,999,563
[45] Date of Patent: Mar. 12, 1991

[54] SEPARATELY POWER-FEEDING WELDING GENERATOR

[75] Inventor: Toshimichi Suzuki, Gunma, Japan

[73] Assignee: Sawafui Electric Co., Ltd., Tokyo, Japan

[21] Appl. No.: 479,763

[22] Filed: Feb. 13, 1990

[30] Foreign Application Priority Data

Feb. 14, 1989 [JP] Japan ................................. 1-33930

[51] Int. Cl.[5] .............................................. B23K 9/10
[52] U.S. Cl. ...................................... 322/90; 219/133; 307/16; 322/27
[58] Field of Search .................. 322/7, 8, 90, 100, 27; 307/16; 219/133

[56] References Cited

U.S. PATENT DOCUMENTS

| | | | |
|---|---|---|---|
| 3,809,995 | 5/1974 | Hardin | 322/90 X |
| 4,009,431 | 2/1977 | Johnson | 322/7 |
| 4,314,195 | 2/1982 | Muter | 322/90 |
| 4,539,486 | 9/1985 | Saito et al. | 322/90 X |
| 4,904,841 | 2/1990 | English | 219/133 |

*Primary Examiner*—R. J. Hickey
*Attorney, Agent, or Firm*—McGlew & Tuttle

[57] ABSTRACT

A separately power-feeding welding generator having at least two main generating windings for supplying power to loads by rectifying an induced voltage and adapted to permit the power being fed from the two main generating windings to the loads to be separately controlled, in which a thyristor is provided in a rectifying circuit for rectifying a voltage induced in at least one of the two main generating windings;

an a-c voltage detector for detecting the voltage induced in at least one of the two main generating windings and a thyristor control signal generator for controlling the conduction angle of the thyristor on the basis of the detected signal of the a-c voltage detector and the reference level obtained by extracting the level of the current being fed to the loads are provided;

a diode which conducts when a positive half-wave is applied in parallel with the thyristor is connected in series with a resistor element;

a first control power supply for rectifying a voltage induced in at least one of the two main generating windings to supply as a control voltage to the a-c voltage detector and a second control power supply which is electrically independent from the first control power supply and supplies a control voltage to the thyristor control signal generator are provided.

3 Claims, 4 Drawing Sheets

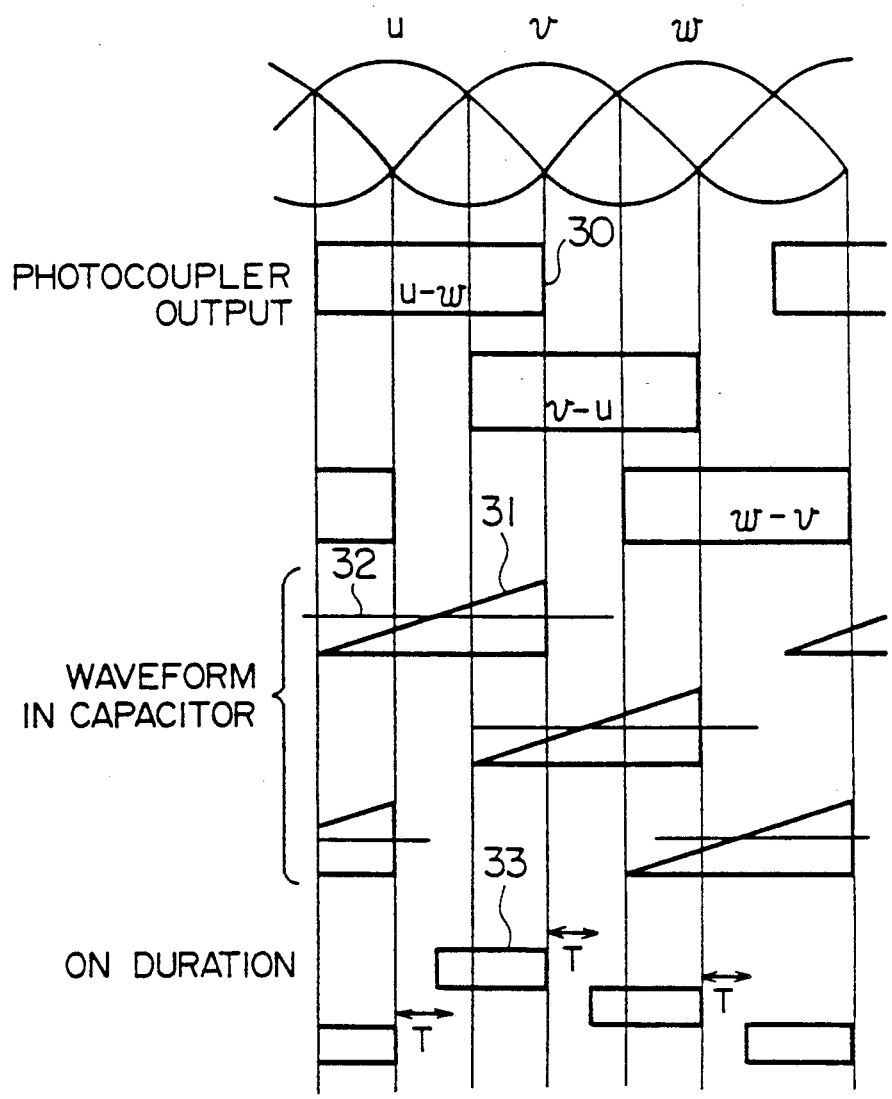

4,999,563

SEPARATELY POWER-FEEDING WELDING GENERATOR

BACKGROUND OF THE INVENTION

1. Field of the Invention

This invention relates generally to a separately power-feeding welding generator, and more particularly to a separately power-feeding welding generator adapted to control the output of at least one of main generating windings by thyristor control to ensure separate power-feeding control.

2. Description of the Prior Art

The present applicant previously proposed in Japanese patent application No. 133930-1984 a separately power-feeding welding generator having main generating windings for a plurality of welding power supplies and adapted to control the output of at least one of the main generating windings by means of thyristor control to ensure separate power-feeding control.

FIG. 4 is a circuit diagram of the welding generator previously proposed by the present applicant. With this circuit configuration, a separately power-feeding welding generator has been realized, in which outputs from a plurality of main generating windings can be independently controlled, and the difference between a current during welding and a current in a shortcircuited state can be reduced without unwantedly reducing no-load current, and the voltage across the output terminals is prevented from being interrupted.

In FIG. 4, a circuit configuration having only one main generating winding and only one rectifying circuit is shown in the interest of simplicity. In addition, a circuit configuration for controlling a thyristor corresponding to the W phase is shown for also simplicity.

With this circuit configuration, however, the following unwanted problems are encountered due to different electrical appliance and material control laws in various countries.

(1) In a dielectric strength test (between the output terminal of the generator and the ground), semi-conductor elements might be damaged because test voltage is applied directly to the thyristor control circuit.

(2) If the voltage applied across the battery terminals becomes excessive (over 20 volts, for example) due to the failure of the regulator (not shown in FIG. 4) for charging the battery (the d-c power supply 15 in FIG. 4) for supplying control voltage to the control circuit, the d-c power supply control circuit 16 shown in FIG. 4 might be adversely affected.

Therefore, a circuit configuration suited to electrical appliance and material control laws in various countries has long been hoped for.

SUMMARY OF THE INVENTION

It is an object of this invention to provide a separately power-feeding welding generator adapted to protect semiconductor elements in the thyristor control circuit during a dielectric strength test.

It is another object of this invention to provide a control power supply which never adversely affects the thyristor control circuit even when excessive voltage is applied to the battery as a d-c power supply during charging.

It is still another object of this invention to provide a surge voltage absorbing circuit for absorbing the surge voltage generated as a result of intermittent welding operations.

BRIEF DESCRIPTION OF THE DRAWINGS

FIG. 3 is a waveform diagram of assistance in explaining the operation of the same welding generator.

Figure 2:
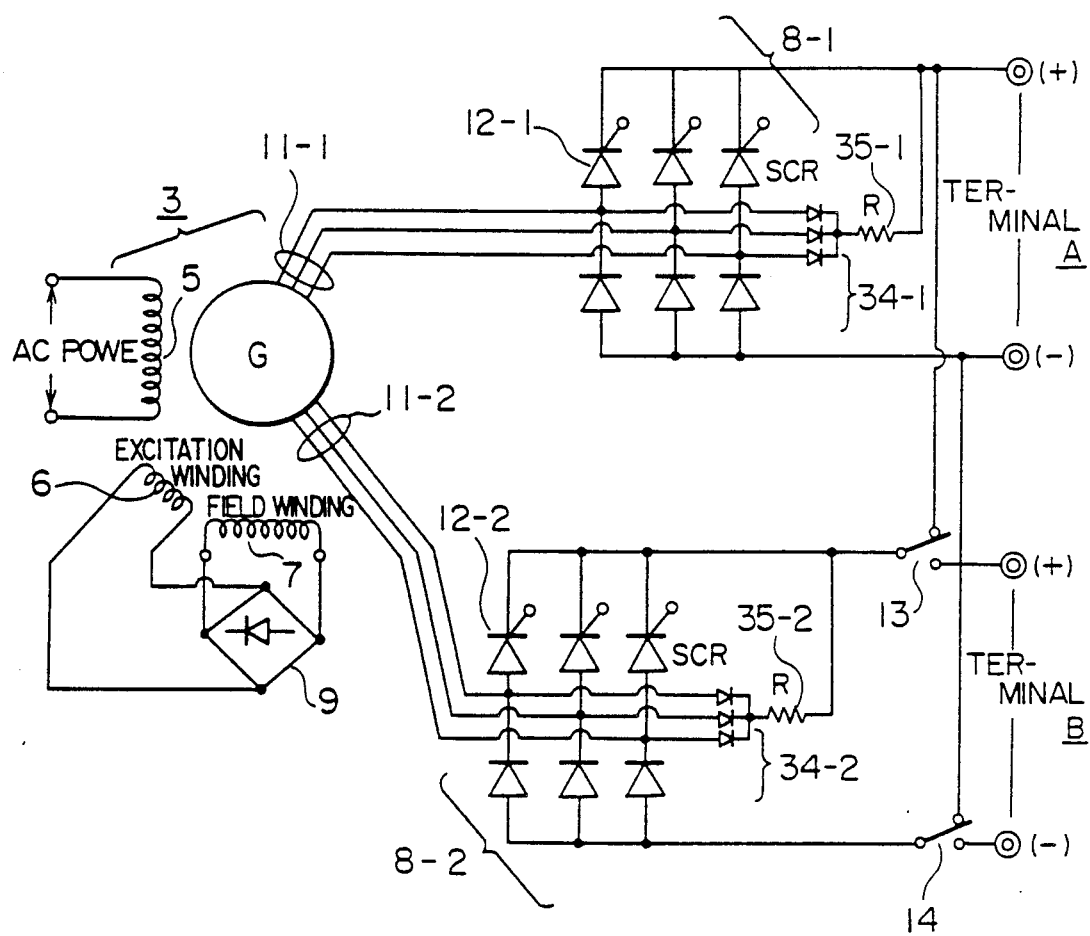
FIG. 2 is a diagram illustrating the concept of a separately power-feeding welding generator.

DETAILED DESCRIPTION OF PREFERRED EMBODIMENTS:

First, a separately power-feeding welding generator will be outlined, referring to FIG. 2 showing the concept of the separately power-feeding welding generator.

In FIG. 2, reference numeral 3 refers to a generator; 5 to an a-c power winding; 6 to an excitation winding; 7 to a field winding; 8-1 and 8-2 to rectifying circuits; 11-1 and 11-2 to the output wires of main generating windings; 12-1 and 12-2 to thyristors (or thyristor groups); 13 and 14 to changeover switches, for changing over two d-c outputs separately or in parallel; 34-1 and 34-2 to diodes, provided in parallel with the thyristors 12-1 and 12-2; 35-1 and 35-2 to resistor elements. Though not shown in the figure, the thyristor groups 12-1 and/or 12-2 are adapted to control outputs by giving a reference voltage level which is determined in accordance with load current to control conduction angles in accordance therewith. The diodes 34-1 and 34-2 conduct when a positive half-wave voltage is applied.

In FIG. 2, the thyristor groups 12-1 and/or 12-2 are adapted to control conduction angles. When a thyristor corresponding to the W phase, for example, is taken as an example among the thyrstors corresponding to the U phase, the V phase and the W phase, the conduction angle of the thyristor corresponding to the W phase is adapted to be controlled in accordance with the reference voltage level determined in accordance with load current, as will be described later with reference to FIGS. 1 and 3.

Consequently, as the reference voltage level (the reference voltage level set corresponding to the first main generating winding) is set at a desired level, the thyristor group 12-1 is controlled in accordance with that level. Thus, by separately controlling the thyristor groups 12-1 and 12-2, the respective welding currents thereof can also be controlled separetely.

It should be noted, however, that the voltages appearing on the positive and negative terminals shown in the figure may be temporarily interrupted because the conduction angles of the thyristor groups 12-1 and 12-2 are controlled. But such voltage interruption is prevented because voltage is fed from the diodes 34-1 and 34-2 immediately before the interruption.

Figure 1:
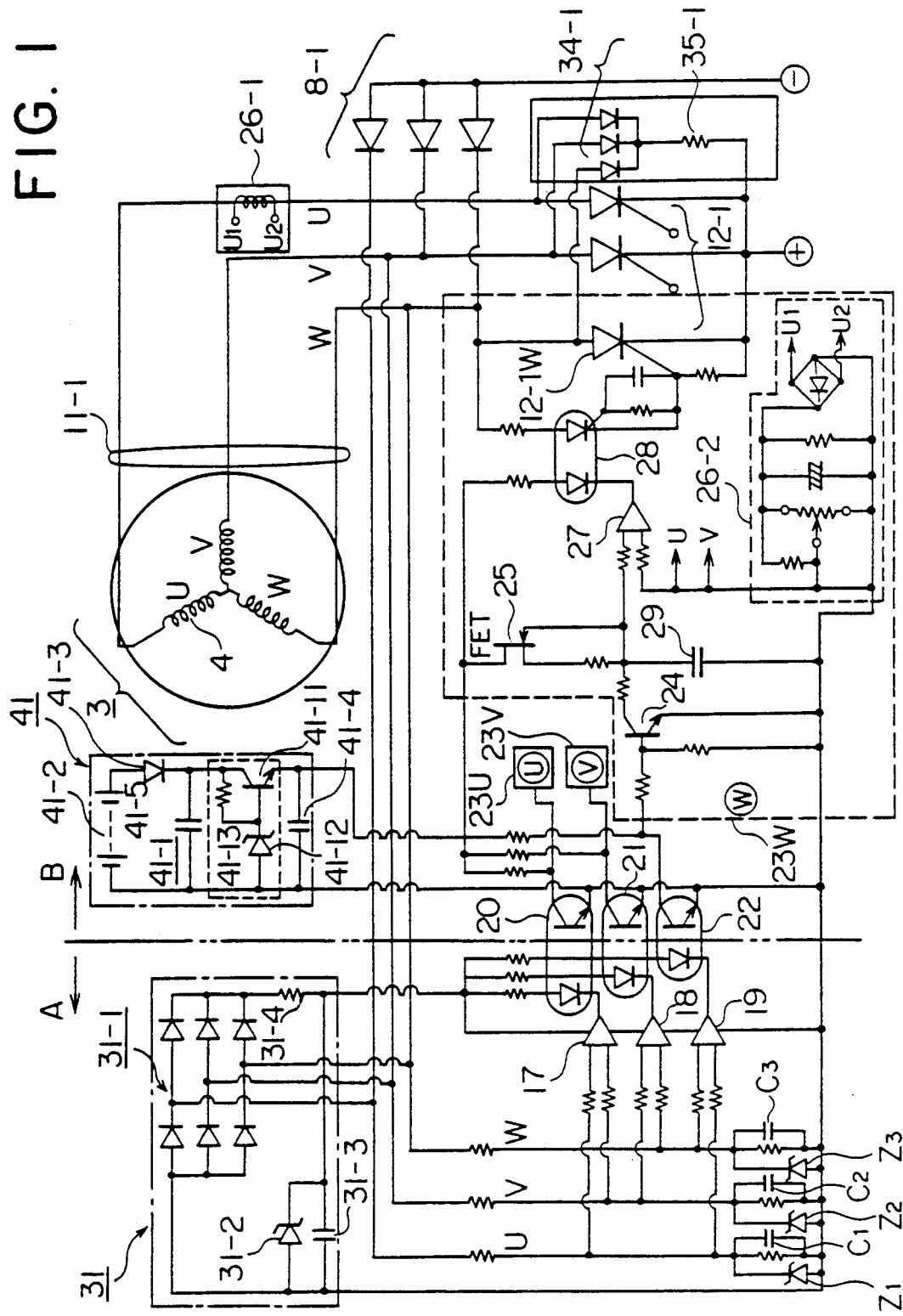
FIG. 1 is a circuit diagram of a thyristor control signal generator and an a-c voltage detector in an embodiment of this invention.

FIG. 1 shows a circuit configuration of an embodiment of this invention in which the thyristor corresponding to the W phase is controlled. FIG. 3 is a waveform diagram of assistance in explaining the operation.

FIG. 1 shows a circuit configuration having only one main generating winding and one rectifying circuit for simplicity. Only a configuration for controlling the thyristor of the W phase is shown also for simplicity.

In FIG. 1, reference numerals 3, 8-1, 11-1, 12-1, 34-1 and 35-1 correspond to like numerals shown in FIG. 2. 12-1W represents a thyristor corresponding to the W phase. Numeral 4 refers to a main generating winding; 17 through 19 to comparators; 20 through 22 to photocouplers; 23U, 23V and 23W to thyristor controllers; 24 to a transistor; 25 to an FET; 26-1 and 26-2 to voltage generators for setting reference voltage levels; 27 to a comparator; 28 to a photocoupler; and 29 to a capacitor; 31 to a first control power supply consisting of a rectifying circuit 31-1 for converting the a-c output of the generator 3, a Zener diode 31-2, a capacitor 31-3 and a resistor element 31-4; 41 to a second control power supply consisting of a constant voltage generator comprising a transistor 41-11, a Zener diode 41-12 and a resistor element 41-13, a battery 41-2, a diode 41-3, capacitors 41-4 and 41-5.

The three-phase output from the main generating winding 4 is converted into d-c current by the rectifying circuit 8-1. The d-c current is controlled by controlling the conduction angle of the thyristor 12-1. In the circuit configuration shown in FIG. 1, the controller 23W for the thyristor 12-1W is shown for simplicity, as noted above, but the controllers 23U and 23V also exist for controlling the voltages of the U phase and the V phase.

The voltages of the U phase through the W phase in the output wires 11-1 are compared in the comparators 17 through 19. That is, the output of the comparator 17 is kept at a low level so long as the voltage of the U phase remains smaller than the voltage of the V phase. The output of the comparator 18 is kept at a low level so long as the voltage of the V phase remains smaller than the voltage of the W phase. The output of the comparator 19 is kept at a low level so long as the voltage of the W phase remains smaller than the voltage of the U phase. The photocoupler output u-w (30) shown in FIG. 3 represents the duration in which the photocoupler 22 shown in FIG. 1 produces an output as the comparator 19 is turned on.

During the interval the photocoupler is on, the transistor 24 is held in off state, charging the capacitor 29 via the FET 25. The waveform (31) in the capacitor 29 shown in FIG. 3 represents the terminal voltage in the capacitor 29. If the reference voltage level set by the voltage generator 26-2 is a voltage level 32, as shown in FIG. 3, then the comparator 27 remains on, as shown by the on duration 33 in FIG. 3, turning on the thyristor 12-1W via the photocoupler 28. The on duration of the thyristor 12-1W is controlled in accordance with the reference voltage level 32 corresponding to the load current. Although description has been omitted, the same applies to the voltages of the U and V phases. The voltage of the voltage generator 26-2 is used in common for controlling each of the U, V and W phases.

As shown by the on duration 33 in FIG. 3, there is a likelihood that durations (T in the figure) in which all the thyristors in the thyristor group 12-1 (12-2) are not turned on may occur, if there do not exist the diode 34-1 (34-2) and the resistor element 35-1 (35-2) shown in FIG. 1 or FIG. 2.

The diode 34-1 (34-2) is provided in parallel with the thyristor group 12-1 (12-2) and connected to the positive terminal via the resistor element 35-1 (35-2). For this reason, even when a duration T in which the thyristor is not turned on is about to occur, voltage is fed to the postive terminal via the diode 34-1 (34-2) during the duration, preventing the voltage on the positive terminal from being interrupted. Thus, there is no likelihood of arc unwantedly disappearing during welding.

Figure 4:
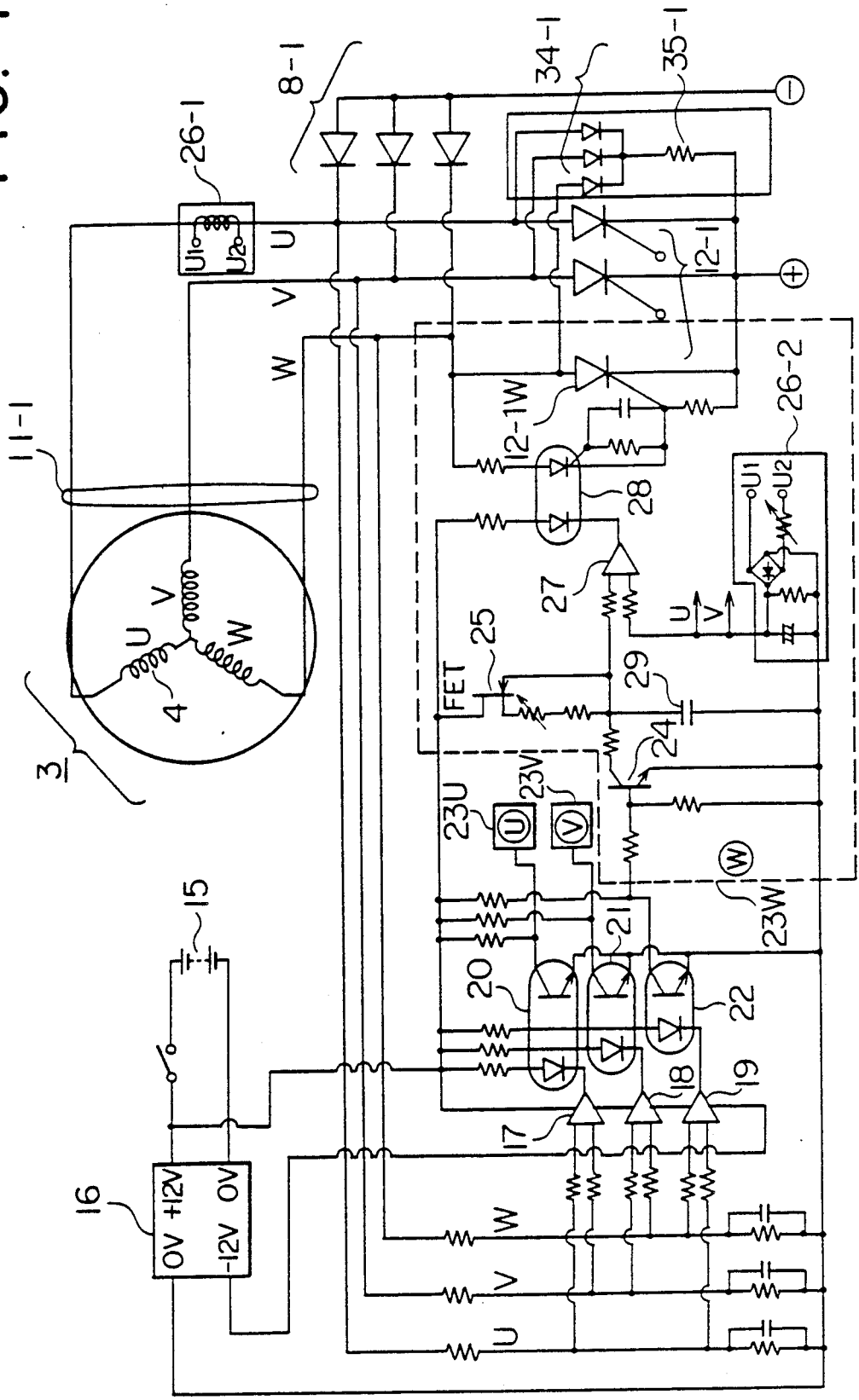
FIG. 4 is a circuit diagram of a thyristor control signal generator and an a-c voltage detector of the conventional type.

In the prior art shown in FIG. 4, the control voltage of the thyristor control circuit is supplied from the d-c power supply 15 and the d-c power supply control circuit 16. In this invention, on the other hand, control power supplies are separately provided for the a-c voltage detector (the section shown by arrow A) constituting the thyristor control circuit and the thyristor control signal generator (the section shown by arrow B). That is, the control voltage for the a-c voltage detector is supplied from the first control power supply 31 by using the output voltage of the generator 3, and the control voltage for the thyristor control signal generator is supplied from the second control power supply 41.

More specifically, in the construction that the control voltage for the a-c voltage detector is supplied from the first control power supply 31, the a-c output of the generator 3 is converted into d-c voltage in the rectifying circuit 31-1 and supplied as the control voltage for the a-c voltage detector. The Zener diode 31-2 and the capacitor 31-3 are used for absorbing the surge voltage generated across the output terminals of the rectifying circuit 31-1 for some reason or other. The capacitors C1, C2 and C3, and the Zener diodes Z1, Z2 and Z3 perform similar functions.

In the construction where the control voltage for the thyristor control signal generator is provided by supplying the terminal voltage of the battery 41-2 from the second control power supply 41 via the constant voltage generating circuit 41-1, the semiconductor elements in the thyristor control signal generator can be protected from being damaged by electrically insulating the battery 41-2 from the a-c output of the generator 3 because even when a dielectric strength test is performed on the generator 3, test voltage is not applied directly to the semiconductor elements. Since consideration is given so that a transistor having a large withstanding voltage and allowable loss as the transistor 41-11 as a constituent of the constant voltage generating circuit 41-1, the transistor 41-11 and the semiconductor elements of the thyristor control signal generator are prevented from being damaged even when the terminal voltage of the battery 41-2 happen to rise for some reason or other. The diode 41-3 in the second control power supply 41 is used to prevent electric current from flowing in the battery 41-2 in the opposite direction, and the capacitor 41-4 and 41-5 are provided for absorbing surge voltage.

As described above, this invention makes it possible to separately control outputs from a plurality of main generating windings, and protect the semiconductors in the thyristor control circuit from being damaged during a dielectric strength test by having such a construction that the control power supplies for the a-c voltage detector the thyristor control circuit constituting the thyristor circuit are separately provided, and the battery power supply for feeding control voltage to the thyristor control signal generator is insulated from the a-c output of the generator. This invention also makes it possible to reduce the difference between the welding current and the shortcircuited current without unwantedly reducing the non-load voltage. Furthermore, the voltage across the output terminals can be prevented from being interrupted, and semiconductor elements can be protected from being damaged since the surge voltage produced by intermittent welding operation.

I Claim:

1. A separately power-feeding welding generator having at least two main generating windings for supplying power to loads by rectifying an induced voltage and adapted to permit said power being supplied from said two main generating windings to said loads to be separately controlled, characterized in that a thyristor is provided in a rectifying circuit for rectifying a voltage induced in at least one of said two main generating windings, an a-c voltage detector for detecting a voltage induced in at least one of said two main generating windings and a thyristor control signal generator having such a construction that the conduction angle of said thyristor is controlled in accordance with the signal detected by said a-c voltage detector and a reference level obtained by extracting the level of electric current supplied to said loads are provided, and a first control power supply for rectifying the voltage induced by at least one of said two main generating windings to supply as a control voltage to said a-c voltage detector and a second control power supply which is electrically independent from said first control power supply and supplies a control voltage to said thyristor control signal generator are provided.

2. A separately power-feeding welding generator as set forth in claim 1 therein said second control power supply comprises at least a battery and a constant voltage generating circuit, supplies the terminal voltage of said battery as a control voltage for said thyristor control signal generator via said constant voltage generating circuit, and protects thyristor control circuits.

3. A separately power-feeding welding generator as set forth in claim 1 wherein surge voltage absorbers are provided in said second control power supply and said a-c voltage detector.

* * * * *